ns011888693B2

(12) United States Patent
Ravishankar et al.

(10) Patent No.: US 11,888,693 B2
(45) Date of Patent: Jan. 30, 2024

(54) TIME-DIVISION MULTIPLEXING (TDM) IN INTEGRATED CIRCUITS FOR ROUTABILITY AND RUNTIME ENHANCEMENT

(71) Applicant: Xilinx, Inc., San Jose, CA (US)

(72) Inventors: Chirag Ravishankar, Erie, CO (US); Dinesh D. Gaitonde, Freemont, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/657,977

(22) Filed: Apr. 5, 2022

(65) Prior Publication Data

US 2023/0318921 A1 Oct. 5, 2023

(51) Int. Cl.
| H04J 3/02 | (2006.01) |
| H04L 41/08 | (2022.01) |
| H04L 49/10 | (2022.01) |
| H04L 41/0893 | (2022.01) |
| H04L 49/109 | (2022.01) |

(52) U.S. Cl.
CPC ............ H04L 41/0893 (2013.01); H04J 3/02 (2013.01); H04L 49/109 (2013.01)

(58) Field of Classification Search
CPC ....... H04J 3/02; H04L 41/0893; H04L 49/109
See application file for complete search history.

(56) References Cited

U.S. PATENT DOCUMENTS

| 7,702,004 B2* | 4/2010 | Deas ...................... H04L 25/085 370/289 |
| 8,479,142 B2* | 7/2013 | Borkovic ................ G06F 30/30 370/321 |
| 9,129,043 B2* | 9/2015 | Pandya ............. G06F 16/90344 |
| 9,141,557 B2* | 9/2015 | Pandya ............... G06F 12/1408 |
| 9,485,048 B2* | 11/2016 | Liboiron-Ladouceur .................... H04Q 11/06 |
| 9,680,765 B2* | 6/2017 | Kaul ....................... H04L 12/50 |
| 9,798,842 B1* | 10/2017 | Hutton .................. G06F 30/333 |
| 2022/0100691 A1* | 3/2022 | Noguera Serra ... G06F 15/7807 |
| 2022/0109446 A1* | 4/2022 | Rotker ........... H03K 19/017581 |

OTHER PUBLICATIONS

Xilinx, Versal ACAP SelectIO Resources, Architecture Manual, AM010 (v1.2) Apr. 2, 2021, 170 pages.
Xilinx, Versal AI Core Series Data Sheet: DC and AC Switching Characteristics, Product Specification, DS957 (v1.2) Jul. 1, 2021, 74 pages.

* cited by examiner

*Primary Examiner* — Alpus Hsu
(74) *Attorney, Agent, or Firm* — Kevin T. Cuenot

(57) ABSTRACT

Implementing a circuit design using time-division multiplexing (TDM) can include determining a net signature for each of a plurality of nets of a circuit design. For each net, the net signature specifies location information for a driver and one or more loads of the net. The plurality of nets having a same net signature can be grouped according to distance between drivers of the respective nets. One or more subgroups can be generated based on a TDM ratio for each group. For one or more of the subgroups, a TDM transmitter circuit is connected to a TDM receiver circuit through a selected interconnect, the drivers of the nets of the subgroup are connected to the TDM transmitter circuit, and loads of the nets of the subgroup are connected to the TDM receiver circuit.

20 Claims, 8 Drawing Sheets

800

Determine a net signature for each of a plurality of nets of a circuit design, wherein for each net, the net signature specifies location information for a driver and one or more loads of the net
802

Group the plurality of nets having a same net signature according to distance between drivers of the respective nets
804

Generate one or more subgroups for each group based on a Time-Division Multiplexing (TDM) ratio to be used for the circuit design
806

Connect a TDM transmitter circuit to a TDM receiver circuit through a selected interconnect, the drivers of the nets of the subgroup to the TDM transmitter circuit, and loads of the nets of the subgroup to the TDM receiver circuit
808

TIME-DIVISION MULTIPLEXING (TDM) IN INTEGRATED CIRCUITS FOR ROUTABILITY AND RUNTIME ENHANCEMENT

TECHNICAL FIELD

This disclosure relates to integrated circuits (ICs) and, more particularly, to implementing nets of circuit designs within ICs using time-division multiplexing (TDM).

BACKGROUND

Time-division multiplexing (TDM) is a design technique used to time share physical resources within an electronic system for transmitting and receiving data. In general, multiple signals from multiple drivers may be sent to a transmitter circuit via separate, physical communication links. The multiple signals are clocked at a first clock frequency. The transmitter circuit is capable of sampling the multiple signals at a second clock frequency that is significantly higher than the first clock frequency. The transmitter serializes the data and sends the serialized data over a single, physical communication link at the second clock frequency. A receiver circuit deserializes the serialized data (e.g., the serialized sampled values) from the transmitter circuit. The receiver circuit then sends the individual samples out over separate physical, communication links at a lower clock frequency (e.g., the first clock frequency) to the various loads of the respective drivers.

SUMMARY

In one or more example implementations, a method includes determining, using computer hardware, a net signature for each of a plurality of nets of a circuit design. For each net, the net signature specifies location information for a driver and one or more loads of the net. The method includes grouping, using the computer hardware, the plurality of nets having a same net signature according to distance between drivers of the respective nets. The method includes generating, using the computer hardware, one or more subgroups for each group based on a time-division multiplexing (TDM) ratio to be used for the circuit design. The method includes, for one or more of the subgroups, using the computer hardware, connecting a TDM transmitter circuit to a TDM receiver circuit through a selected interconnect, the drivers of the nets of the subgroup to the TDM transmitter circuit, and loads of the nets of the subgroup to the TDM receiver circuit.

In one or more example implementations, a system includes a processor configured to initiate operations. The operations include determining a net signature for each of a plurality of nets of a circuit design. For each net, the net signature specifies location information for a driver and one or more loads of the net. The operations include grouping the plurality of nets having a same net signature according to distance between drivers of the respective nets. The operations include generating one or more subgroups for each group based on a TDM ratio to be used for the circuit design. The operations include, for one or more of the subgroups, connecting a TDM transmitter circuit to a TDM receiver circuit through a selected interconnect, the drivers of the nets of the subgroup to the TDM transmitter circuit, and loads of the nets of the subgroup to the TDM receiver circuit.

In one or more example implementations, a computer program product includes one or more computer readable storage media, and program instructions collectively stored on the one or more computer readable storage media. The program instructions are executable by computer hardware to initiate the various operations described herein.

In one or more example implementations, an integrated circuit (IC) includes programmable circuitry having a circuit architecture including a plurality of fabric sub-regions (FSRs). Each FSR includes a plurality of programmable circuit blocks. The IC includes a plurality of inter-FSR interconnects. Each inter-FSR interconnect is dedicated to coupling circuit components disposed in different FSRs. The IC includes a plurality of TDM transmitter circuits each having a plurality of input ports and an output port. The output port of each TDM circuit is coupled to a respective one of the plurality of inter-FSR interconnects. The IC includes a plurality of TDM receiver circuits each having a plurality of output ports and an input port. The input port of each TDM receiver circuit is coupled to a respective one of the plurality of inter-FSR interconnects.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 8 illustrates another example method of routing inter-FSR nets of a circuit design.

DETAILED DESCRIPTION

Figure 1:
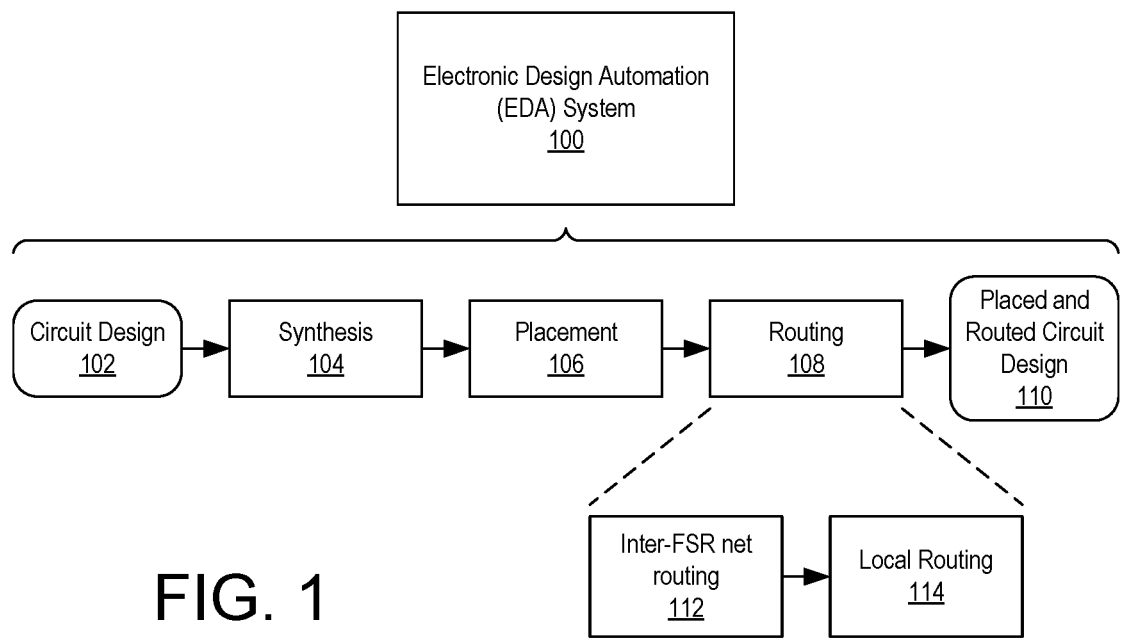
FIG. 1 illustrates an example of an Electronic Design Automation (EDA) system performing a design flow including an enhanced routing phase on a circuit design.

This disclosure relates to integrated circuits (ICs) and, more particularly, to implementing nets of circuit designs within ICs using time-division multiplexing (TDM). In one or more example implementations, methods, systems, and computer program products are provided relating to implementing circuit designs using TDM technology. In one or more other example implementations, circuit architectures are provided that utilize TDM technology to implement selected nets of a circuit design intended for implementation in an IC. The example circuit architectures described herein may be realized in an IC using programmable circuitry (e.g., programmable logic), hardened circuit blocks, or a combination of both.

In one aspect, an Electronic Design Automation (EDA) system is capable of detecting opportunities for applying TDM to selected nets of a circuit design. For example, the EDA system is capable of detecting particular nets of the circuit design that qualify as candidates for implementation using TDM, categorizing the candidate nets into various groupings, and implementing the selected candidate nets using TDM based, at least in part, on the categorization.

The design techniques described herein may be applied to circuit designs that are intended to run or operate at a clock frequency that is below that of the maximum clock frequency usable or attainable by circuitry of the target IC in which the circuit design is to be implemented. One class of such circuit designs includes those created for emulation and prototyping. Such circuit designs often run at clock frequencies that are a fraction of the maximum clock frequency supported by the target IC since such circuit designs generally lack maximum target operating frequencies. For purposes of illustration, a circuit design representing a design under test may be created that runs at 50-200 MHz, while the target IC in which that circuit design is intended to be implemented is capable of operating at clock frequencies of approximately 600-800 MHz. It should be appreciated, however, that the inventive arrangements are not intended to be limited to circuit designs for emulation and prototyping and may be applied to any other circuit design including nets that meet the criteria described herein.

The inventive arrangements described herein may reduce the runtime of an EDA system in performing a design flow and, in particular, performing routing, for a circuit design. The use of TDM technology to implement nets and, particularly, nets of a minimum or particular length, can reduce the number of such nets to be routed, which reduces routing congestion with respect to long wires of the target IC (e.g., reduces competition for long wires by reducing the number of nets competing for such long wires). The reduced routing congestion reduces the runtime of the implementation tools.

The inventive arrangements described herein also facilitate parallelization of the implementation tools. That is, having applied TDM technology to particular nets of the circuit design, certain portions of the circuit design may be routed in parallel or concurrently by the EDA system without loss of quality. For example, multiple instances of a computer-based router may be executed, where each instance of the router is capable of routing a different portion of the circuit design in parallel or concurrently. The routing of multiple portions of the circuit design in parallel may be implemented without loss of optimality or quality and, as noted, may reduce runtime of the implementation tools.

Further aspects of the inventive arrangements are described below with reference to the figures.

FIG. 1 illustrates certain operative features of an example EDA system 100. EDA system 100 may be implemented as a data processing system, e.g., a computer, executing suitable operational software or program code to perform one or more of the operations described within this disclosure. An example of a data processing system that may be used to implement EDA system 100 is described in connection with FIG. 10.

In the example of FIG. 1, EDA system 100 is capable of receiving a circuit design 102. Circuit design 102 may be specified in a hardware description language (HDL). An HDL may be used to describe the behavior of a design as data transfers that occur between registers each clock cycle. Examples of HDLs may include, but are not limited to, Verilog and VHDL. HDLs are sometimes referred to as register transfer level (RTL) descriptions of circuit designs and/or digital systems. Circuit design 102 may also be specified as a network list (netlist). In other examples, circuit design 102 may be specified using a high-level programming language such as C/C++, SystemC, or the like. In the case where circuit design 102 is specified as a high-level programming language, the circuit design may be converted into an HDL description through High-Level Synthesis.

EDA system 100 is capable of implementing a design flow. As generally understood by one skilled in the art, a design flow refers to a multi-stage process for implementing circuit design 102 within an IC. The design flow performed by the EDA system 100 may include synthesis 104, placement 106, and routing 108 (e.g., as performed by a synthesizer, a placer, and a router, respectively). In general, synthesis 104 refers to the process of generating a gate-level netlist from a high-level description of a circuit or system. The netlist may be technology specific in that the netlist is intended for implementation in a particular IC referred to as a "target IC." Placement 106 refers to the process of assigning elements of the synthesized circuit design to particular instances of circuit blocks and/or resources having specific locations on the target IC. Routing 108 refers to the process of selecting or implementing particular routing resources, e.g., wires also referred to as "interconnects," to electrically couple the various circuit blocks of the target IC after placement 106. The resulting circuit design, referring to placed and routed circuit design 110, having been processed through the design flow, may be implemented within the target IC.

In the example of FIG. 1, routing 108 may be implemented as a multi-stage process. The routing 108 may include an inter-fabric sub-region (inter-FSR) routing phase shown as inter-FSR net routing 112 and a local routing phase shown as local routing 114. Within this disclosure, the term fabric sub-region (FSR) refers to a region of programmable circuitry, where the programmable circuitry may include programmable logic, within the target IC that is created by clocking boundaries. The phrase "programmable circuitry" refers to circuitry used to build reconfigurable digital circuits. An FSR refers to such a region within a particular IC or device. A single die, whether part of a single-die IC or a multi-die IC, typically includes two or more FSRs. An inter-FSR interconnect refers to a circuit element or elements (e.g., wire(s) and/or programmable interconnect points) that establish a connection between two or more FSRs.

For example, an inter-FSR interconnect is capable of conveying a signal from one driver located in a selected FSR to one or more loads of that driver located in one or more other FSRs. The inter-FSR interconnect is the circuit resource that may be time-shared among multiple drivers and loads of such drivers by including TDM circuitry working in cooperation with the inter-FSR interconnect. In this context using TDM circuitry and the inter-FSR interconnect in combination, an inter-FSR interconnect is capable of conveying signals from one or more drivers to the respective loads of the drivers. The term "inter-FSR wire" may be used interchangeably with the term "inter-FSR interconnect."

Figure 9:
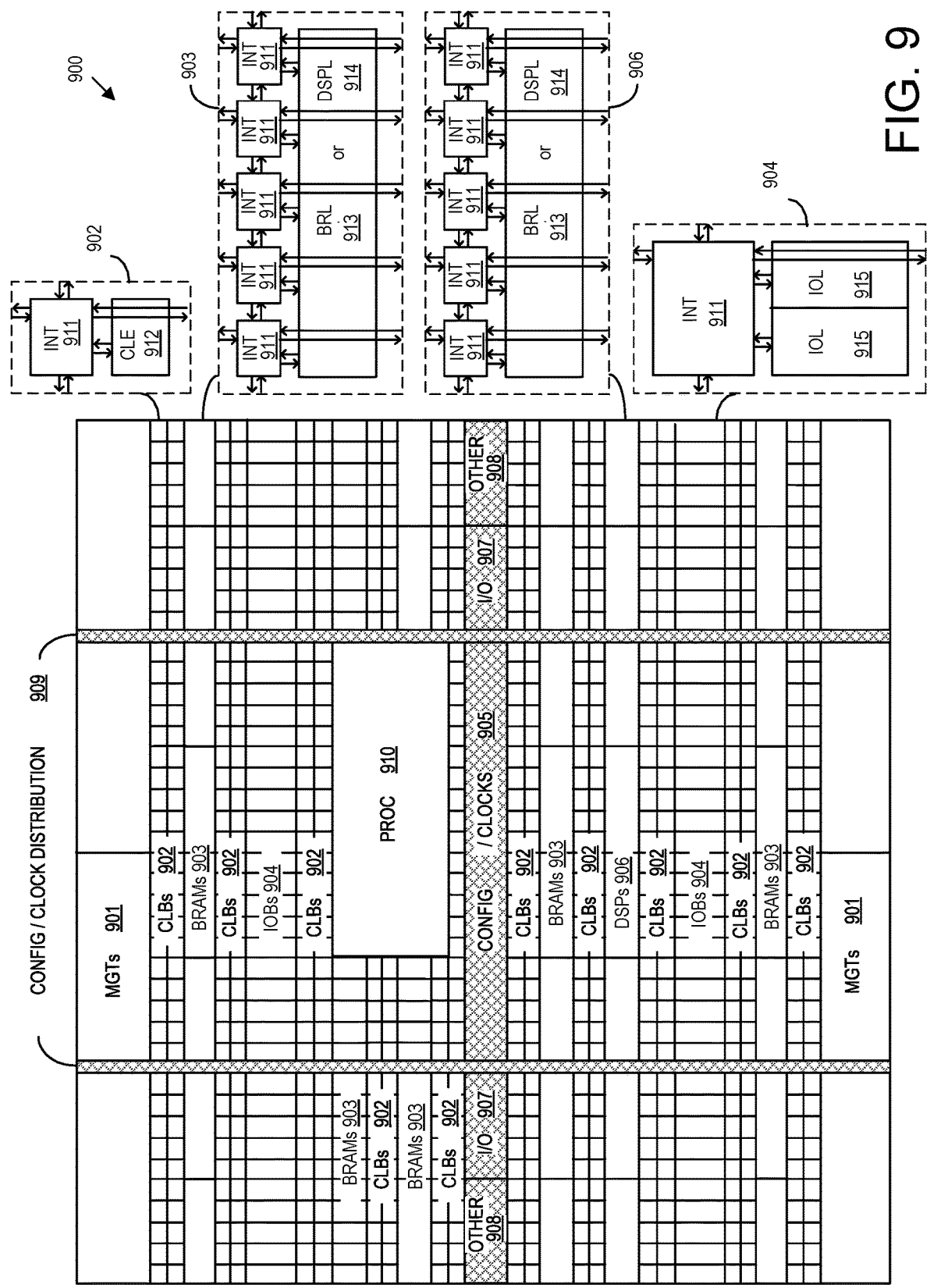
FIG. 9 illustrates an example architecture for a programmable IC.

The programmable circuitry of the IC typically includes a plurality of programmable circuit blocks, sometimes referred to as "tiles," that are arranged in columns and rows within the IC. An example architecture for an IC that includes programmable circuitry is illustrated in the example of FIG. 9. A circuit block, or tile, refers to a unit of circuit architecture in the target IC. A programmable circuit block can include multiple, atomic instances such as lookup tables (LUTs) and/or flip-flops (FFs). The programmable circuit block boundary is determined based on having repeatable instances of the programmable circuit blocks in the target IC. For purposes of illustration, a typical FSR includes approximately 50×60 programmable circuit blocks. Appreciably, different ICs may include fewer or more programmable circuit blocks in an FSR.

Referring again to the example of FIG. 1, the inter-FSR net routing 112 is capable of performing a variety of operations relating to the routing of selected inter-FSR nets. The term net means a connection that exists in the netlist, e.g., in circuit design 102, between a driver and one or more loads. A net may be expressed or defined as a graph. The routing 108, as described, is capable of mapping nets to particular interconnects.

In the example of FIG. 1, inter-FSR net routing 112 is capable of mapping inter-FSR nets to particular inter-FSR interconnects. An inter-FSR net refers to a net that connects a load located in a first FSR with at least one load of the net located in a different FSR than the load. The inter-FSR interconnects used to route the inter-FSR nets tend to be longer interconnects or wires than the interconnects used within FSRs (e.g., intra-FSR interconnects) to perform local routing 114. Thus, in the example of FIG. 1, inter-FSR net routing 112 routes inter-FSR nets to inter-FSR interconnects while local routing 114 routes nets that exist entirely within FSRs (e.g., intra-FSR nets) to interconnects that reside entirely within the FSRs (e.g., intra-FSR interconnects). In accordance with the inventive arrangements described herein, the inter-FSR net routing 112 is capable of assigning two or more inter-FSR nets to a single inter-FSR interconnect using TDM.

Figure 2:
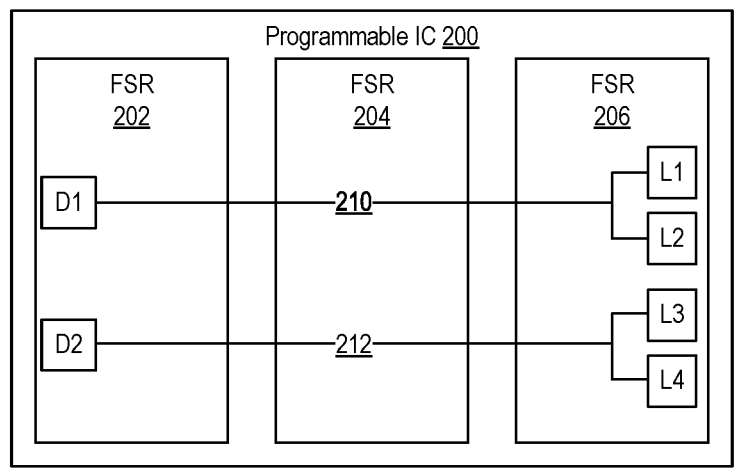
FIG. 2 illustrates an example of a programmable integrated circuit (IC) including a plurality of fabric sub-regions (FSRs).

FIG. 2 illustrates an example of a programmable IC 200 including a plurality of FSRs. In the example of FIG. 2, programmable IC 200 includes FSRs 202, 204, and 206. For purposes of illustration, two inter-FSR nets 210, 212 of a circuit design are illustrated with reference to programmable IC 200. As shown, inter-FSR net 210 has a driver D1 that drives loads L1 and L2. Inter-FSR net 212 has a driver D2 that drives two loads L3 and L4. Drivers D1 and D2 are disposed in FSR 202. Loads L1, L2, L3, and L4 are disposed in FSR 206.

Programmable IC 200 may be implemented as any of a variety of different types of ICs that include at least some programmable circuitry. A programmable IC is an IC that includes at least some programmable circuitry. As noted, programmable logic is a type of programmable circuitry. Examples of programmable ICs may include, but are not limited to, Field Programmable Gate Arrays (FPGAs), System-on-Chips (SoCs) having at least some programmable circuitry (e.g., programmable logic), Application-Specific ICs including at least some programmable circuitry, and the like.

Figure 3:
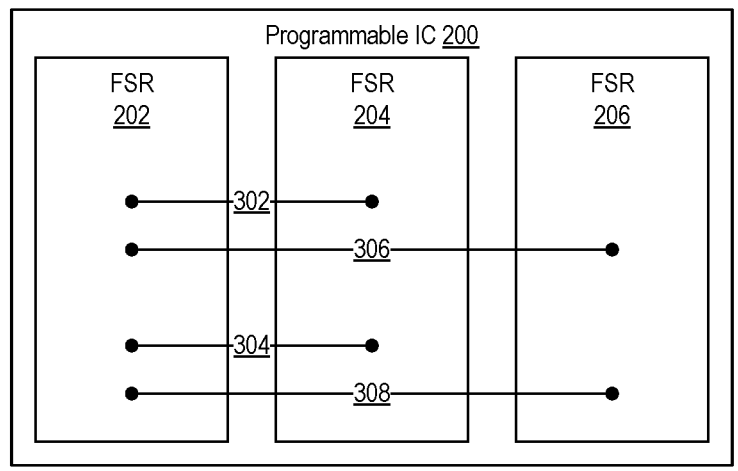
FIG. 3 illustrates the example programmable IC of FIG. 2 including a plurality of inter-FSR interconnects.

FIG. 3 illustrates the example programmable IC 200 of FIG. 2 including a plurality of inter-FSR interconnects. For purposes of illustration, programmable IC 200 includes two inter-FSR interconnects 302, 304 that couple FSRs 202 and 204 and two inter-FSR interconnects 306, 308 that couple FSRs 202 and 206.

In one or more example implementations, inter-FSR interconnects 302, 304, 306, and 308 may be implemented as interconnect circuitry, e.g., wires and/or programmable interconnect points, within programmable IC 200 that are available to route any type of net. For example, the inter-FSR interconnects 302, 304, 306, and 308 may be used to route inter-FSR nets as well as intra-FSR, or local, nets. In one or more other example implementations, inter-FSR interconnects 302, 304, 306, and 308 may be implemented as interconnect circuitry that is specifically reserved for routing only inter-FSR nets. For example, inter-FSR interconnects 302, 304, 306, and 308 may be used to route only inter-FSR nets and may not be used to route intra-FSR nets. In one or more other example implementations, one or more of the inter-FSR interconnects 302, 304, 306, and 308 may be used to route only inter-FSR nets while one or more others of the inter-FSR interconnects 302, 304, 306, and 308 may be used to route both inter-FSR nets and intra-FSR nets.

Figure 4:
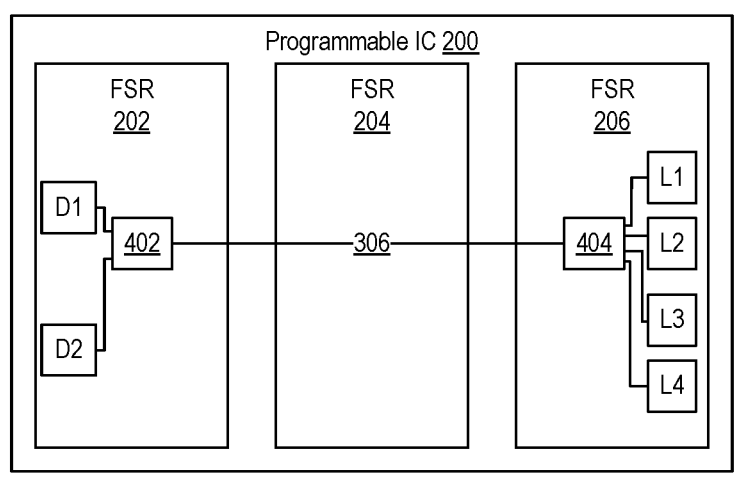
FIG. 4 illustrates an example of an inter-FSR net implementation in programmable IC 200 using an inter-FSR interconnect and time-division multiplexing (TDM).

FIG. 4 illustrates an example of an inter-FSR net implementation in programmable IC 200 using an inter-FSR interconnect and TDM. In the example of FIG. 4, the two inter-FSR nets 210 and 212 of FIG. 2 have been routed using the inter-FSR interconnect 306 of FIG. 3. In the example, because inter-FSR nets 210 and 212 are serialized and time-division multiplexed, both inter-FSR nets 210, 212 may be assigned to the same inter-FSR interconnect 306.

In the example of FIG. 4, a TDM transmitter circuit 402 is included along with a TDM receiver circuit 404. TDM transmitter circuit 402 includes a plurality of input ports for receiving a plurality of input signals from the drivers D1 and D2 of inter-FSR nets 210, 212 assigned to the TDM transmitter circuit 402 and includes an output port that is coupled to one end of an inter-FSR interconnect such as inter-FSR interconnect 306. As shown, the signal from each of drivers D1 and D2 may be provided to TDM transmitter circuit 402 via a separate and independent signal path. TDM receiver circuit 404 includes an input port that is coupled to an opposing end of an inter-FSR interconnect such as inter-FSR interconnect 306 and includes a plurality of output ports coupled to the respective loads L1, L2, L3, and L4 of the different loads of the inter-FSR nets 210, 212 via different local interconnects.

As pictured, TDM transmitter circuit 402 is included in the same FSR as drivers D1 and D2. In this example, FSR 202, which includes both of drivers D1 and D2 of inter-FSR nets 210, 212 is referred to as the "source" FSR. FSR 206, which includes the loads L1, L2, L3, and L4 of the inter-FSR nets 210, 212, is referred to as the load FSR.

TDM transmitter circuit 402 is capable of time-division multiplexing signals received from drivers D1 and D2 and placing the time-division multiplexed signals, having been serialized, onto inter-FSR interconnect 306. TDM receiver circuit 404 is capable of deserializing the received signals and outputting the deserialized signals into their original form as separate signals (e.g., prior to serialization) that are output onto appropriate local interconnects to the respective loads L1, L2, L3, and L4. In order to perform TDM, TDM transmitter circuit 402 and TDM receiver circuit 404 operate at a higher clock frequency than that of inter-FSR nets 210, 212. In the example, TDM transmitter circuit 402 and TDM receiver circuit 404 must operate at a clock frequency that is greater than two times the clock frequency of inter-FSR nets 210, 212.

In the example of FIG. 4, the TDM ratio is 2:1. The TDM ratio is the serialization/deserialization ratio referring to the number of signals that are shared on one link (e.g., on one inter-FSR interconnect). Depending on the clock frequencies of the inter-FSR nets sharing a link and the clock frequency of the TDM transmitter circuit and the TDM receiver circuit, TDM ratios may be larger, e.g., 4:1, or 8:1. For example, 6 inter-FSR interconnects each capable of operating with an 8:1 TDM ratio is capable of supporting, e.g., routing, 48 inter-FSR nets.

In one or more example implementations, TDM transmitter circuit 402 and TDM receiver circuit 404 are implemented using programmable circuitry, e.g., programmable logic. For example, TDM transmitter circuit 402 may be implemented as a LUT configured to perform serialization of received signals clocked by a clock having a first clock frequency. The LUT may be coupled to a FF clocked by a second clock having a higher clock frequency. The TDM receiver circuit 404 may be implemented as a FF receiving the serialized signal and clocked by the second clock. The FF of the TDM receiver circuit 404 is coupled to a LUT configured to deserialize the received signal. The output from the LUT may be passed through FFs clocked by the first clock signal.

By implementing the TDM transmitter circuit 402 and the TDM receiver circuit 404 using programmable circuitry, additional flexibility is provided in that such circuits may be implemented nearly anywhere within the available programmable circuitry of the programmable IC 200. That is, wherever sufficient programmable circuitry that is unused by a user circuit design is available, TDM transmitter circuit and or TDM receiver circuit may be implemented.

In one or more other example implementations, TDM transmitter circuit 402 and TDM receiver circuit 404 are implemented using hardened circuit blocks. By implementing the TDM transmitter circuit 402 and the TDM receiver circuit 404 as hardened circuit blocks, such circuits may operate at higher clock frequencies than may be possible in programmable circuitry implementations. This may permit higher TDM ratios to be implemented than using programmable circuitry. In cases where the TDM transmitter circuit 402 and the TDM receiver circuit 404 are implemented as hardened circuit blocks, such hardened circuit blocks may be implemented as tiles in the architecture of the programmable IC. For example, TDM transmitter and/or TDM receiver circuit blocks may be included as rows within the array of programmable circuit blocks and/or as columns of circuit blocks within the array of programmable circuit blocks. In other examples, TDM transmitter and/or TDM receiver circuits may be dispersed at selected or strategic locations throughout the programmable IC 200, e.g., within each of the respective FSRs 202, 204, and/or 206.

In one or more other example implementations, one or more TDM transmitter circuit—TDM receiver circuit pairs may be implemented using hardened circuit blocks while one or more other TDM transmitter circuit—TDM receiver circuit pairs may be implemented using programmable circuitry. In one or more other example implementations, the TDM transmitter circuit (TDM receiver circuit) of a given pair may be implemented as a hardened circuit block, while the TDM receiver circuit (TDM transmitter circuit) of the pair may be implemented as programmable circuitry.

In one or more example implementations, signals of the inter-FSR nets may be synchronously time-division multiplexed or asynchronously time-division multiplexed. As is generally known by one skilled in the art, synchronous TDM assigns a fixed time slot to each connected device (e.g., drivers), whether the device transmits data or not. With asynchronous TDM, time slots are flexible and assigned when connected devices (e.g., drivers) have data that is ready to send.

Figure 5:
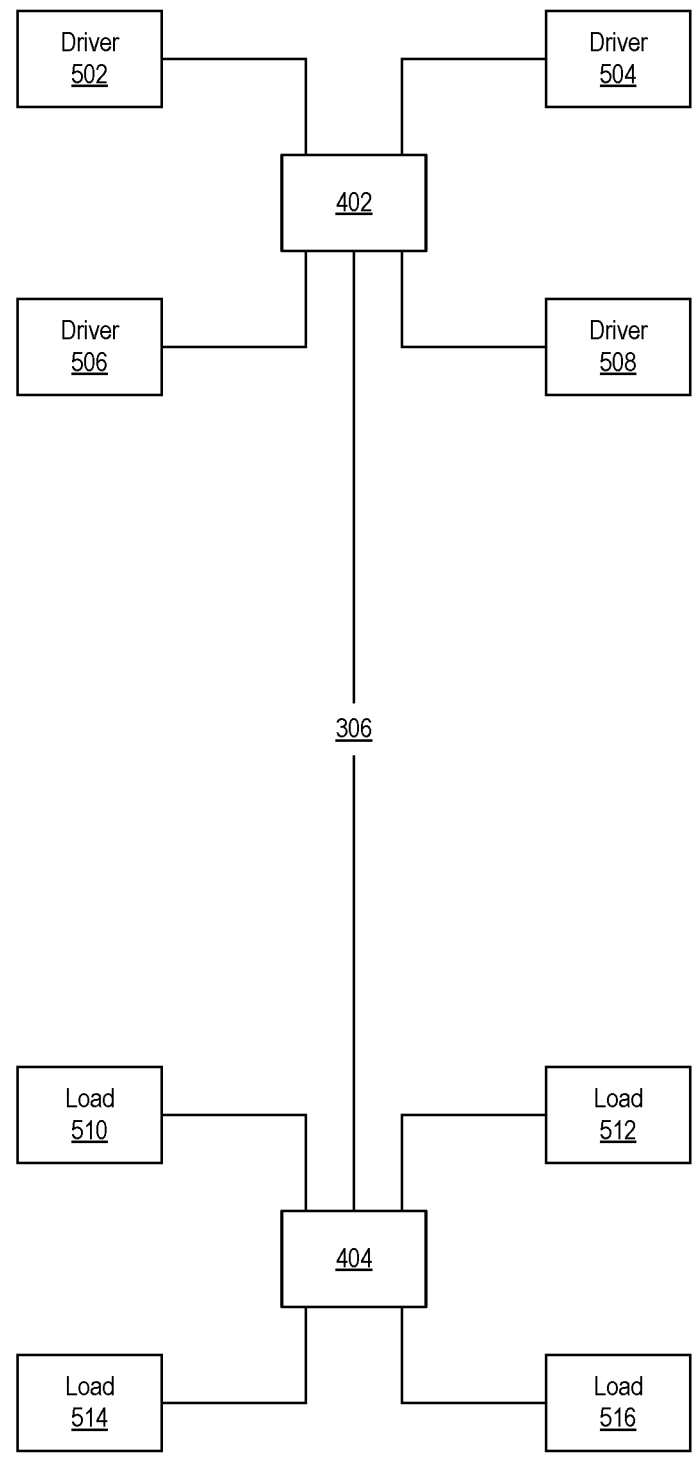
FIG. 5 illustrates an example of placing TDM transmitter and TDM receiver circuits for a plurality of inter-FSR nets of a circuit design.

FIG. 5 illustrates an example of placing TDM transmitter and TDM receiver circuits for a plurality of inter-FSR nets of a circuit design. In the example, TDM transmitter circuit 402, inter-FSR interconnect 306, and TDM receiver circuit 404 are used to route 4 inter-FSR nets formed of drivers 502, 504, 506, 508, and loads 510, 512, 514, and 516. The 4 inter-FSR nets are defined by the driver-load pairs (502: 510), (504:512), (506:514), and (508:516).

The example of FIG. 5 illustrates that the TDM transmitter circuit 402 and/or the TDM receiver circuit 404 may be implemented at a centroid location. For example, TDM transmitter circuit 402 may be implemented at the centroid of the plurality of drivers to which the TDM transmitter circuit 402 is connected. Similarly, TDM receiver circuit 404 may be implemented at the centroid of the plurality of loads to which the TDM receiver circuit 404 is connected. Appreciably, since placement has been performed, the centroid of the drivers and/or loads may be calculated based on the respective positions of the drivers and the respective positions of the loads. In the example of FIG. 5, drivers 502, 504, 506, and 508 may be located within a predetermined distance of one another.

Figure 6:
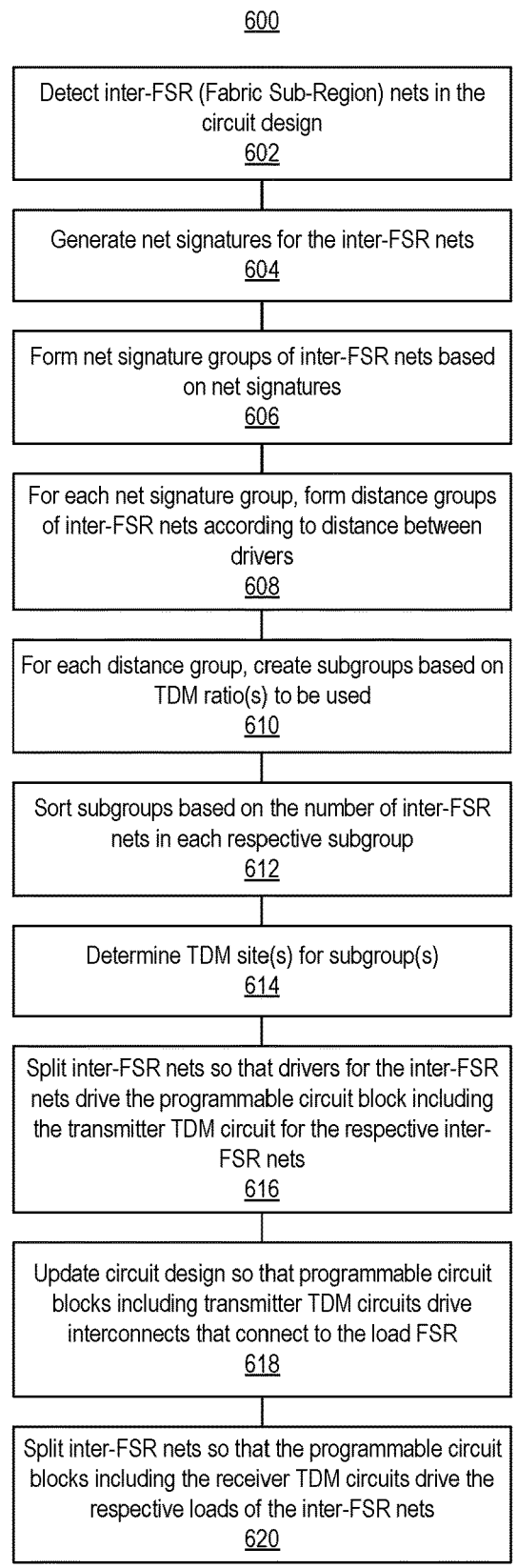
FIG. 6 illustrates an example method of routing inter-FSR nets of a circuit design.

FIG. 6 illustrates an example method 600 of routing inter-FSR nets of a circuit design. Method 600 may be performed by the EDA system described herein in connection with FIG. 1. Method 600 may be performed as part of a routing phase of a design flow by a router. In one aspect, method 600 may be performed during a particular phase of routing as may be performed by the inter-FSR net routing 112. For example, method 600 may be performed as a first routing phase that routes inter-FSR nets that may be followed by a second routing phase that routes intra-FSR nets.

In block 602, the EDA system detects inter-FSR nets in circuit design 102. That is, the EDA system is capable of parsing circuit design 102 to identify each of the inter-FSR nets contained therein. In block 604, the EDA system is capable of generating net signatures for the inter-FSR nets identified in block 602. In one aspect, a net signature is formed of the source FSR of the net and one or more load FSRs of the net. As discussed, the source FSR of a net is the particular FSR in which the driver of the net is located. A load FSR is the FSR in which a load of the net is located. Appreciably, the net signature of an inter-FSR net will include one source FSR and one or more load FSRs depending on the number of loads of the inter-FSR net. Referring to the example of FIG. 2, the net signature of each of the inter-FSR nets 210, 212 is [202, 206] where the source FSR is FSR 202 and the load FSRs are FSRs 206. Since the inter-FSR nets 210, 212 have the same signature, the inter-FSR nets 210, 212 may be grouped together.

In block 606, the EDA system forms net signature groups of inter-FSR nets based on the net signatures. Each net signature group includes only inter-FSR nets having the same net signature. In block 608, for each net signature group (e.g., each group including inter-FSR nets having a same net signature), the EDA system forms distance groups of inter-FSR nets according to distance between drivers. For example, the EDA system processes each net signature group of inter-FSR nets as formed in block 606 and further groups the inter-FSR nets within each respective net signature group according to distance between the drivers. The system is capable of forming distance groups that include inter-FSR nets having drivers that are located within a predetermined distance of one another. The distance may be measured in terms of programmable circuit blocks or tiles. As an illustrative and nonlimiting example, for each net signature group, the EDA system is capable of forming one or more distance groups, where each distance group includes the inter-FSR nets of the net signature group in which the drivers are within N (e.g., where N may equal 2, 3, 4, 5, or other value) programmable circuit blocks of one another.

In block 610, for each distance group, the EDA system creates one or more subgroups based on a defined or predefined TDM ratio to be used. Within this disclosure, subgroups may also be referred to as "TDM groups." For example, if a given subgroup includes 10 inter-FSR nets and the TDM ratio to be used is 8:1, the EDA system subdivides the distance group into two subgroups. First subgroup may include eight inter-FSR nets while the second subgroup may include the remaining two inter-FSR nets. In other examples, the subgroups may be formed to include a more balanced or equal number of inter-FSR nets. Appreciably, the number of subgroups to be formed will depend on the number of inter-FSR nets included in each distance group and the TDM ratio to be used. In cases where the number of inter-FSR nets of a distance group is less than or equal to the leading number in the TDM ratio, the distance group may be left unmodified and be treated as a single subgroup for purposes of the remaining operations described with reference to FIG. 6. For example, if the TDM ration is 8:1 and the distance group includes 6 inter-FSR nets, the EDA system treats the distance group of 6 inter-FSR nets as a subgroup.

In block 612, the EDA system sorts the subgroups created in block 610 based on the number of inter-FSR nets in each respective subgroup. For example, the EDA system may sort the subgroups in order from largest to smallest. The sorting prioritizes the subgroups so that those subgroups with the largest number of inter-FSR nets may be processed prior to subgroups with fewer inter-FSR nets.

In block 614, the EDA system determines TDM sites for the subgroups. In one aspect, in block 614, the system determines a location at which a TDM transmitter circuit and a TDM receiver circuit may be implemented for each subgroup. As discussed, in one aspect, the EDA system may calculate centroids for drivers and loads of subgroups and use the centroids to place the TDM transmitter and TDM receiver circuits as illustrated in the example of FIG. 5.

In one aspect, for subgroups having fewer than a predetermined number of inter-FSR nets (e.g., those including a single inter-FSR net), the EDA system may skip processing of such subgroups and leave such subgroups as is in unmodified form. In other words, the subgroups including only the predetermined number of inter-FSR nets or fewer are not implemented using time-division multiplexing.

Having selected locations for the TDM transmitter circuits and the TDM receiver circuits for the various subgroups, the EDA system may update circuit design 102 to specify such circuit structures to be implemented in programmable circuitry. That is, the EDA system may instantiate TDM transmitter circuits and TDM receiver circuits within the circuit design 102 for each subgroup that includes more than one inter-FSR net.

In cases where TDM receiver circuits and/or TDM transmitter circuits are implemented as hardened circuit blocks, such circuit blocks have predetermined locations on the target IC. In that case, in block 614, the EDA system need only determine sites or locations for each such circuit block. In one aspect, the EDA system is capable of determining centroids for drivers and loads of each subgroup as previously described and select a TDM transmitter circuit closest to the centroid of the driver and the TDM transmitter circuit closest to the centroid of the loads for each subgroup with more than one inter-FSR net.

In block 616, the EDA system splits inter-FSR nets so that the driver for each inter-FSR net drives the programmable circuit block including the TDM transmitter circuit for the respective inter-FSR net. The operations described in block 616 may be performed for each subgroup (e.g., each subgroup including the minimum required number of inter-FSR nets). In block 618, the EDA system updates circuit design 102 so that the TDM transmitter circuits drive inter-FSR interconnects that connect to the load FSRs and, more particularly, to TDM receiver circuits in the respective load FSRs. In block 620, the system splits inter-FSR nets so that the programmable circuit blocks including the TDM receiver circuits drive the respective loads of the inter-FSR nets. The system may perform the operations described in connection with block 620 for each subgroup (e.g., each subgroup including the minimum required number of inter-FSR nets).

In one or more example implementations, the operations described in connection with blocks 616, 620 may be performed as part of the local routing 114 as connections between drivers and TDM transmitter circuits and TDM receiver circuits and loads may be considered local connections that exist entirely within a particular FSR. In cases where the inter-FSR interconnects become congested and there is an insufficient number of inter-FSR interconnects, the system may undo the respective TDM-based operations described.

The example technique illustrated in FIG. 6 may be applied in the beginning of the router flow where all the inter-FSR nets are either assigned to subgroups or are routed on regular interconnects. Once the inter-FSR nets are routed, such routes may be locked (e.g., prevented from being unrouted at least for purposes of performing local routing). Accordingly, the operations performed by local routing 114 may be parallelized on a per-FSR basis for local routes (e.g., intra-FSR routes). For example, in an IC that includes 40 FSRs, the system may run 40 parallel routing threads for performing local routing, thereby reducing runtime of the EDA system 100.

In cases where there are dedicated inter-FSR interconnects, efficient implementations of circuit design 102 may utilize such dedicated interconnects for all inter-FSR nets. This means that inter-FSR nets would not utilize other interconnects that are available for use for local routing. Such a technique may provide an optimized implementation of circuit design 102 compared to a flow that locks inter-FSR net routing that uses interconnects not specifically reserved or dedicated for inter-FSR nets (e.g., interconnects that may also be used for intra-FSR nets).

In one or more other example implementations, inter-FSR nets need not be routed prior to intra-FSR nets. For example, in cases where there are no reserved inter-FSR interconnects for use only by inter-FSR nets, inter-FSR nets may be routed concurrently with intra-FSR nets. In that case, the parallelism described with respect to routing local interconnects (e.g., intra-FSR nets) of different FSRs in parallel may not be performed.

In various test scenarios involving a library of test circuit designs, application of the inventive arrangements described herein reduced peak congestion for routing by up to approximately 30%. This reduction in congestion not only may reduce the runtime of the router, but also increase the likelihood that a feasible routing solution will be generated by the EDA system 100.

In the example implementations described herein, for synchronous TDM, there may be limitations on the maximum frequency that may be used due to circuit limitations. The following example illustrates an implementation that uses a 2:1 TDM ratio where the inter-FSR nets (e.g., signals 1 and 2) are running at 100 MHz while the TDM transmitter circuit and TDM receiver circuit run at 200 MHz. In this example, signal 1 is latched by the TDM transmitter circuit at the first rising edge of the TDM clock (e.g., 200 MHz clock), while signal 2 is latched at the second rising edge of the TDM clock.

The serialized signals 1 and 2 are delivered to the TDM receiver circuit at the subsequent TDM clock edge. While signal 1 shows up in the subsequent edge of the 100 Mhz clock at the destination, there is a violation for signal 2 that results in a multi-cycle path. In addition, there is little slack available for data to travel from the source FSR to the TDM transmitter circuit and from the TDM receiver circuit to the loads in the load FSR.

To understand the foregoing, consider the expression $T_{signal}=(k+1)T_{TDM}$. In the expression, $T_{signal}$ represents the minimum period of the signal, k represents the TDM ratio (e.g., for 8:1 TDM ratio, k=8), and $T_{TDM}$ represents the minimum period of the TDM clock. For dual-edge TDM clocks, the $T_{signal}$ may be halved. With this in mind, Table 1 illustrates possible clock speeds of the IC that are needed to support the TDM ratios and design frequencies shown (in MHz).

TABLE 1

| TDM Ratio | Design Frequency (MHz) | | | | | | | |
|---|---|---|---|---|---|---|---|---|
| | 10 | 25 | 50 | 100 | 150 | 200 | 250 | 300 |
| 2:1 | 15 | 37.5 | 75 | 150 | 225 | 300 | 375 | 450 |
| 4:1 | 25 | 62.5 | 125 | 250 | 375 | 500 | 625 | 750 |
| 8:1 | 45 | 112.5 | 225 | 450 | 675 | 900 | 1125 | 1350 |

The inventive arrangements described herein also may be used for inter-FSR nets that have a source FSR and a plurality of different load FSRs. For purposes of illustration, consider the following example. An inter-FSR net called Net1 has a driver in FSR(0,0) and loads in FSR(1,0), FSR(1,1), and FSR(1,2). Another inter-FSR net called Net2 has a driver in FSR(0,0) and loads in FSR(1,0), FSR(1,1), and FSR(1,2). In this example, since Net1 and Net2 have same net signatures, the two inter-FSR nets are grouped together. Inter-FSR interconnects may be used to convey signals from the driver to the various load FSRs and multiple TDM receiver circuits (e.g., one for each of FSRs (1,0), (1,1), and (1,2)) may be included that connect to the respective loads in each of FSRs (1,0), (1,1), and (1,2).

In another example, an inter-FSR net called Net3 has a driver in FSR(0,0) and loads in FSR(1,0), FSR(1,1), and FSR(1,2). Another inter-FSR net called Net4 has a driver in FSR(0,0) and loads in FSR(1,0) and FSR(1,1). In one aspect, Net3 and Net4 may be considered to have different net signatures. In another aspect, Net3 and Net4 may be considered to have same or matching net signatures where the net signature of Net4 is considered a subset of the net signature of Net3. In the latter case, with the net signature of Net4 being a subset of the net signature of Net3, the two nets may be grouped together.

Figure 7A:
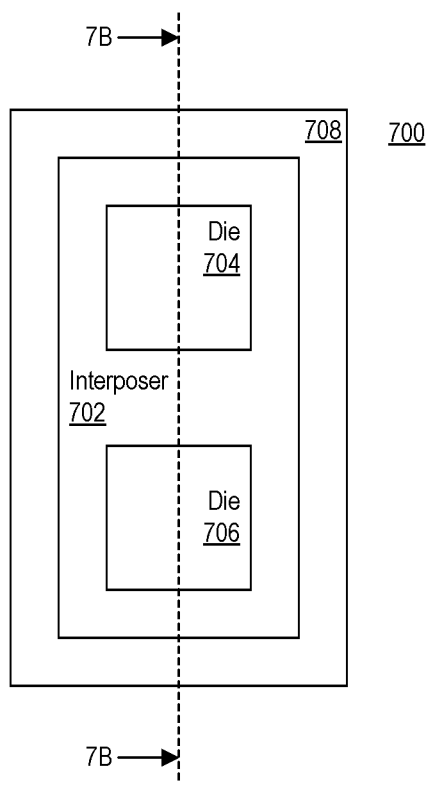
FIGS. 7A and 7B, taken collectively, illustrate an example of a multi-die IC that includes a plurality of FSRs and inter-FSR interconnects implemented in an interposer.
Figure 7B:
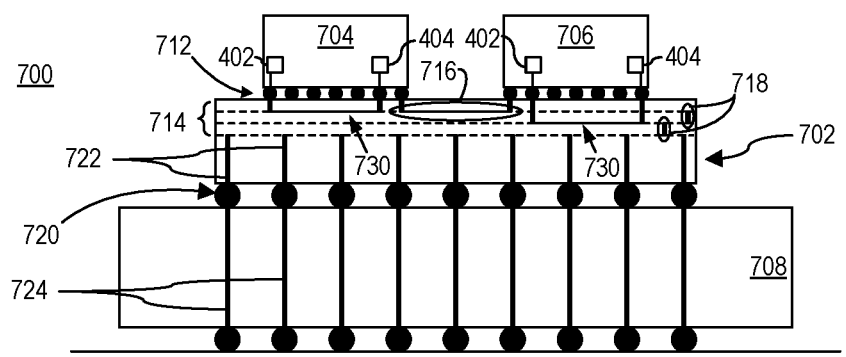

FIGS. 7A and 7B, taken collectively, illustrate an example implementation of a multi-die IC (IC) 700 including a plurality of FSRs. For purposes of discussion, FIGS. 7A and 7B may be referred to collectively as "FIG. 7." In the example of FIG. 7, IC 700 is implemented as a multi-die IC. Within this disclosure, the term "multi-die IC" means an IC implemented to include two or more dies communicatively linked and included within a single package.

FIG. 7A illustrates a topographical view of IC 700. In the example of FIG. 7A, IC 700 is implemented as a "stacked die" type of device formed by stacking multiple dies. IC 700 includes an interposer 702, a die 704, a die 706, and a package substrate 708. Each of dies 704 and 706 is attached to a surface, e.g., a top surface, of interposer 702. In one aspect, dies 704 and 706 are attached to interposer 702 using flip-chip technology. Interposer 702 is attached to a top surface of package substrate 708. FIG. 7 illustrates an example of a target IC where inter-FSR interconnects may be implemented in interposer 702 as opposed to within the dies 704, 706 that include the FSRs. In other examples, each of dies 704, 706 may also include inter-FSR interconnects (not shown).

In general, interposer 702 is an intermediate die disposed between dies 704, 706 and package substrate 708. Interposer 702 is implemented to provide interconnection, routing, and/or a ground/power plane. Package substrate 708 provides the package with mechanical base support and provides an electrical interface for connecting to nodes external to the package. IC 700 may include a cap portion that is not shown in FIG. 7A or 7B for ease of illustration.

In the example of FIG. 7A, interposer 702 is a die having a planar surface on which dies 704 and 706 are horizontally stacked. As shown, dies 704 and 706 are located on the planar surface of interposer 702 side-by-side. The number of dies shown on interposer 702 in FIGS. 7A and 7B is for purposes of illustration and not limitation. In other example implementations, more than two dies may be mounted on interposer 702.

Interposer 702 provides a common mounting surface and electrical coupling for each of dies 704 and 706. The manufacturing of interposer 702 may include one or more process steps that allow the deposition of one or more conductive layers that are patterned to form wires. These conductive layers may be formed of aluminum, gold, copper, nickel, various silicides, and/or other suitable material. Interposer 702 may be manufactured using one or more additional process steps that allow the deposition of one or more dielectric or insulating layer(s) such as, for example, silicon dioxide. Interposer 702 also may include vias and through vias (TVs). TVs may be through silicon vias (TSVs), through glass vias (TGVs), or other via structures depending upon the particular materials used to implement interposer 702 and the substrate thereof. Interposer 702 may have various types of solder bumps, vias, wires, TVs, and under bump metallization (UBM). In one aspect, interposer 702 is implemented as a passive die that does not include any active circuitry. In the case where interposer 702 is implemented as an active die, interposer 702 may include additional process layers forming one or more active devices in reference to electrical devices such as transistors, diodes, etc., that include P-N junctions.

FIG. 7B is a cross-sectional side view of IC 700 of FIG. 7A. FIG. 7B illustrates a view of IC 700 from FIG. 7A taken along cut-line 7B-7B. Each of dies 704 and 706 is electrically and mechanically coupled to a first planar surface of interposer 702 via solder bumps 712. In one example, solder bumps 712 are implemented as micro-bumps. Still, any of a variety of other techniques may be used to attach dies 704 and 706 to interposer 702. For example, bond wires or edge wires may be used to mechanically and electrically attach dies 704 and 706 to interposer 702. In another example, an adhesive material may be used to mechanically attach dies 704 and 706 to interposer 702. The attachment of dies 704 and 706 to interposer 702 using solder bumps 712, as illustrated within FIG. 7B, is provided for purposes of illustration and is not intended as a limitation.

Interposer 702 includes one or more conductive layers 714 illustrated as dashed or dotted lines in interposer 702. Conductive layers 714 are implemented using any of a variety of metal layers such as those previously described. Conductive layers 714 are processed to form patterned metal layers that implement wires 716, 730 of interposer 702. A wire that couples at least two different dies, e.g., dies 704 and 706, is referred to as an inter-die wire. In the example of FIG. 7B, wires 716, formed of the patterned metal layers 714 within interposer 702, are inter-die wires. Wires 716 pass inter-die signals between dies 704 and 706. For example, each of wires 716 couples a solder bump 712 beneath die 704 with a solder bump 712 beneath die 706, thereby allowing the exchange of inter-die signals between dies 704 and 706. Wires 716 may be data wires. In another aspect, wires 716 may include one or more power wires. A power wire may be a wire carrying a voltage potential or a wire having a ground or reference voltage potential.

Wires 730 are examples of inter-FSR interconnects (e.g., inter-FSR wires) that connect one FSR within a single die with another FSR in the same die. For example, one of wires 730 couples a solder bump 712 beneath die 704 that is coupled to a first FSR with another solder bump 712 beneath die 704 coupled to a second FSR, thereby allowing the exchange of inter-FSR signals in die 704. Another of wires 730 couples a solder bump 712 beneath die 706 that is coupled to a third FSR with another solder bump 712 beneath die 706 coupled to a fourth FSR, thereby allowing the exchange of inter-FSR signals in die 706. It should be appreciated that the number of wires 716, 730 illustrated in FIG. 7 is for purposes of illustration and fewer or more of each such type of wire may be included.

Different ones of conductive layers 714 and wires 716 may be coupled together using vias 718. In general, a via structure is used to implement a vertical conductive path. A vertical conductive path refers to a conductive path that is perpendicular to a process layer of the device. In this regard, the vertical portions of wires 716 that contact solder bumps 712 are implemented as vias 718. The use of multiple conductive layers to implement interconnects within interposer 702 allows a greater number of signals to be routed and more complex routing of signals to be achieved within interposer 702.

TVs 722 are vias that form an electrical connection that vertically transverses, e.g., extends through a substantial portion, if not the entirety of, interposer 702. TVs 722, like wires and vias, may be formed of any of a variety of different conductive materials including, but not limited to, copper, aluminum, gold, nickel, various silicides, and/or other suitable materials. As pictured, each of TVs 722 extends from a bottom surface of interposer 702 up to a conductive layer 714 of interposer 702. TVs 722 further may be coupled to a solder bump 712 through one or more of conductive layers 714 in combination with one or more vias 718.

Solder bumps 720 can be used to mechanically and electrically couple a second planar surface of interposer 702 to package substrate 708. In particular example implementations, solder bumps 720 are implemented as controlled collapse chip connection (C4) balls. Package substrate 708 includes conductive paths 724 that couple different ones of solder bumps 720 to one or more nodes beneath package substrate 708 and to other circuit structures such as a circuit board. Accordingly, one or more of solder bumps 720 couple circuitry within interposer 702 to nodes external to IC 700 through circuitry or wiring within package substrate 708.

FIG. 8 illustrates another example method 800 of routing inter-FSR nets of a circuit design. Method 800 may be performed by the EDA system as described in connection with FIG. 1. In block 802, the EDA system determines a net signature for each of a plurality of nets (e.g., inter-FSR nets) of a circuit design. For each net, the net signature specifies location information for a driver and one or more loads (e.g., each load) of the net. As discussed, the location information may be specified as the particular FSR in which the driver or load is located. In block 804, the EDA system groups the plurality of nets having a same net signature according to distance between drivers of the respective nets (e.g., locations of drivers of the nets). In block 806, the EDA system generates one or more subgroups for each group based on a TDM ratio to be used for the circuit design. The TDM ratio specifies a maximum number of inter-FSR nets that may be assigned to a single inter-FSR interconnect. In block 808, the EDA system, for each of the subgroups, connects the following: a TDM transmitter circuit to a TDM receiver circuit through a selected interconnect, the drivers of the nets of the subgroup to the TDM transmitter circuit, and loads of the nets of the subgroup to the TDM receiver circuit.

In one or more example implementations, once subgroups are established and sorted, any of a variety of different routing techniques may be used to route inter-FSR nets incrementally. In cases where one or more inter-FSR nets cannot be routed due to resource limitations, the TDM processing described herein may be undone for such inter-FSR nets and the inter-FSR nets may be routed during the local routing phase. In accordance with the inventive arrangements, inter-FSR nets that provide the highest benefit are prioritized first for TDM processing. It should be appreciated, however, that other techniques may be used. For example, another technique that may be used is to maximize the number of inter-FSR nets that get routed using TDM processing without favoring those inter-FSR nets that offer the highest benefit.

The foregoing and other implementations can each optionally include one or more of the following features, alone or in combination. Some example implementations include all the following features in combination.

In one aspect, the method includes, prior to the grouping the plurality of nets having the same net signature according to distance between the drivers, first creating groups of nets of the plurality of nets based on the net signatures.

In another aspect, each net of the plurality of nets of the circuit design (e.g., the inter-FSR nets) couples a pair of FSRs of a target IC for which the circuit design is routed and the location information of each net signature specifies a source FSR and one or more load FSRs.

In another aspect, the subgroups are prioritized for processing based on a number of nets within each respective subgroup. The subgroups can be prioritized from a largest number of nets to lowest number of nets.

In another aspect, the method includes, for at least one of the subgroups, implementing a TDM transmitter circuit at a centroid of the drivers of the subgroup or implementing a TDM receiver circuit at a centroid of the loads of the subgroup.

In another aspect, the method includes, for at least one of the subgroups, selecting a TDM transmitter circuit for the subgroup based on a centroid of the drivers of the subgroup or selecting a TDM transmitter circuit for the subgroup based on a centroid of the loads of the subgroup.

In another aspect, one or more of the selected interconnects is selected from a plurality of interconnects dedicated for inter-FSR nets.

In another aspect, one or more of the selected interconnects is selected from a plurality of interconnects. The selected interconnect is rendered unavailable for a subsequent routing phase that routes portions of the circuit design within individual FSRs.

In another aspect, one or more of the selected interconnects is implemented in an interposer and the TDM transmitter circuit and the TDM receiver circuit coupled to the one or more selected interconnects implemented in the interposer are disposed in a same die coupled to the interposer.

FIG. 9 illustrates an example architecture 900 for an IC. In one aspect, architecture 900 may be implemented within a programmable IC. A programmable IC is an IC with at least some programmable circuitry. Programmable circuitry may include programmable logic. For example, architecture 900 may be used to implement a field programmable gate array (FPGA). Architecture 900 may also be representative of a system-on-chip (SoC) type of IC. An example of an SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 900 includes several different types of programmable circuit, e.g., logic, blocks. For example, architecture 900 may include a large number of different programmable tiles including multi-gigabit transceivers (MGTs) 901, configurable logic blocks (CLBs) 902, random-access memory blocks (BRAMs) 903, input/output blocks (IOBs) 904, configuration and clocking logic (CONFIG/CLOCKS) 905, digital signal processing blocks (DSPs) 906, specialized I/O blocks 907 (e.g., configuration ports and clock ports), and other programmable logic 908 such as digital clock managers, analog-to-digital converters, system monitoring logic, and so forth.

In some ICs, each programmable tile includes a programmable interconnect element (INT) 911 having standardized connections to and from a corresponding INT 911 in each adjacent tile. Therefore, INTs 911, taken together, implement the programmable interconnect structure for the illustrated IC. Each INT 911 also includes the connections to and from the programmable logic element within the same tile, as shown by the examples included at the right of FIG. 9.

For example, a CLB 902 may include a configurable logic element (CLE) 912 that may be programmed to implement user logic plus a single INT 911. A BRAM 903 may include a BRAM logic element (BRL) 913 in addition to one or more INTs 911. Typically, the number of INTs 911 included in a tile depends on the height of the tile. As pictured, a BRAM tile has the same height as five CLBs, but other numbers (e.g., four) also may be used. A DSP tile 906 may include a DSP logic element (DSPL) 914 in addition to an appropriate number of INTs 911. An IOB 904 may include, for example, two instances of an I/O logic element (IOL) 915 in addition to one instance of an INT 911. The actual I/O pads connected to IOL 915 may not be confined to the area of IOL 915.

In the example pictured in FIG. 9, the shaded area near the center of the die, e.g., formed of regions 905, 907, and 908, may be used for configuration, clock, and other control logic. Shaded areas 909 may be used to distribute the clocks and configuration signals across the breadth of the programmable IC.

In the example of FIG. 9, the architecture may include a plurality of FSRs each including a plurality of programmable circuit blocks. Different pairs of FSRs may be connected by way of inter-FSR interconnects (e.g., longer wires, PIP, and/or INTs).

Some ICs utilizing the architecture illustrated in FIG. 9 include additional logic blocks that disrupt the regular columnar structure making up a large part of the IC. The additional logic blocks may be programmable blocks and/or dedicated circuitry. For example, a processor block depicted as PROC 910 spans several columns of CLBs and BRAMs.

In one aspect, PROC 910 may be implemented as dedicated circuitry, e.g., as a hardwired processor, that is fabricated as part of the die that implements the programmable circuitry of the IC. PROC 910 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 910 may be omitted from architecture 900 and replaced with one or more of the other varieties of the programmable blocks described. Further, such blocks may be utilized to form a "soft processor" in that the various blocks of programmable circuitry may be used to form a processor that can execute program code as is the case with PROC 910.

In general, the functionality of programmable circuitry is not established until configuration data is loaded into the IC. A set of configuration bits may be used to program programmable circuitry of an IC such as an FPGA. In general, programmable circuitry is not operational or functional without first loading configuration data into the IC. The configuration data effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 910.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 910 or a soft processor. In some cases, architecture 900 includes a dedicated configuration processor that loads the configuration bitstream to the appropriate configuration memory and/or processor memory. The dedicated configuration processor does not execute user-specified program code. In other cases, architecture 900 may utilize PROC 910 to receive the configuration bitstream, load the configuration bitstream into appropriate configuration memory, and/or extract program code for execution.

FIG. 9 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 9 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 910 within the IC are for purposes of illustration only and are not intended as limitations.

Figure 10:
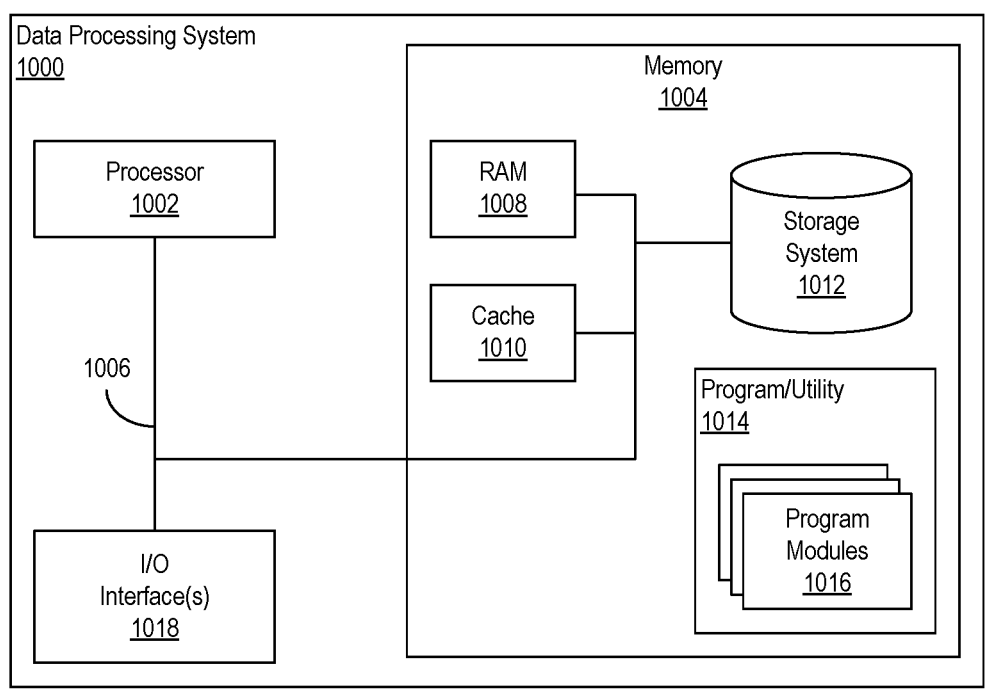
FIG. 10 illustrates an example of a data processing system that may be used to implement an EDA system and perform the operations described herein.

FIG. 10 illustrates an example of a data processing system 1000 that may be used to implement an EDA system and perform the operations described herein. As defined herein, "data processing system" means one or more hardware systems configured to process data, each hardware system including at least one processor programmed to initiate operations and memory.

The components of data processing system 1000 can include, but are not limited to, a processor 1002, a memory 1004, and a bus 1006 that couples various system components including memory 1004 to processor 1002. Processor 1002 may be implemented as one or more processors. In an example, processor 1002 is implemented as a central processing unit (CPU). As defined herein, the term "processor" means at least one circuit capable of carrying out instructions contained in program code. The circuit may be an integrated circuit or embedded in an integrated circuit. Processor 1002 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1006 represents one or more of any of a variety of communication bus structures. By way of example, and not limitation, bus 1006 may be implemented as a Peripheral Component Interconnect Express (PCIe) bus. Data processing system 1000 typically includes a variety of computer system readable media. Such media may include computer-readable volatile and non-volatile media and computer-readable removable and non-removable media.

Memory 1004 can include computer-readable media in the form of volatile memory, such as random-access memory (RAM) 1008 and/or cache memory 1010. Data processing system 1000 also can include other removable/non-removable, volatile/non-volatile computer storage media. By way of example, storage system 1012 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1006 by one or more data media interfaces. Memory 1004 is an example of at least one computer program product.

Program/utility 1014, having a set (at least one) of program modules 1016, may be stored in memory 1004. Program/utility 1014 is executable by processor 1002. By way of example, program modules 1016 may represent an operating system, one or more application programs, other program modules, and program data. Program modules 1016, upon execution, cause data processing system 1000, e.g., processor 1002, to carry out the functions and/or methodologies of the example implementations described within this disclosure. Program/utility 1014 and any data items used, generated, and/or operated upon by data processing system 1000 are functional data structures that impart functionality when employed by data processing system 1000. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

For example, one or more of the program modules 1016, upon execution, may implement the EDA system 100 described in connection with FIG. 1. The program modules 1016, upon execution, may execute operations on a circuit design as described herein so that the circuit design may be physically realized in a target IC. Such operations may include generation of configuration data from a placed and routed circuit design, where the configuration data may be loaded into a target IC to physically implement a circuit design therein.

Data processing system 1000 may include one or more Input/Output (I/O) interfaces 1018 communicatively linked to bus 1006. I/O interface(s) 1018 allow data processing system 1000 to communicate with one or more external devices and/or communicate over one or more networks such as a local area network (LAN), a wide area network (WAN), and/or a public network (e.g., the Internet). Examples of I/O interfaces 1018 may include, but are not limited to, network cards, modems, network adapters, hardware controllers, etc. Examples of external devices also may include devices that allow a user to interact with data processing system 1000 (e.g., a display, a keyboard, and/or a pointing device) and/or other devices such as accelerator card.

Data processing system 1000 is only one example implementation. Data processing system 1000 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 10 is not intended to suggest any limitation as to the scope of use or functionality of example implementations described herein. Data processing system 1000 is an example of computer hardware that is capable of performing the various operations described within this disclosure. In this regard, data processing system 1000 may include fewer components than shown or additional components not illustrated in FIG. 10 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1000 may be operational with numerous other general-purpose or special-purpose computing system environments or configurations. Examples of computing systems, environments, and/or configurations that may be suitable for use with data processing system 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 1000 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:

grouping, using computer hardware, a plurality of nets of a circuit design having a same net signature according to distance between drivers of the plurality of nets, wherein each net signature specifies location information for the driver of the net and one or more loads of the net;

generating, using the computer hardware, one or more subgroups for each group based on a time-division multiplexing (TDM) ratio to be used for the circuit design, wherein the TDM ratio specifies a number of signals shared on an interconnect used as an inter-fabric sub-region interconnect; and for one or more of the subgroups, using the computer hardware, connecting a TDM transmitter circuit to a TDM receiver circuit through a selected interconnect used as the inter-fabric sub-region interconnect, connecting the drivers of the nets of the subgroup to the TDM transmitter circuit, and loads of the nets of the subgroup to the TDM receiver circuit.

2. The method of claim 1, further comprising:

prior to the grouping the plurality of nets having the same net signature according to distance between the drivers, first creating groups of nets of the plurality of nets based on the net signatures.

3. The method of claim 1, wherein each net of the plurality of nets of the circuit design couples a pair of fabric sub-regions of a target integrated circuit for which the circuit design is routed and the location information of each net signature specifies a source fabric sub-region and one or more load fabric sub-regions.

4. The method of claim 1, wherein the subgroups are prioritized for processing based on a number of nets within each subgroup, wherein the subgroups are prioritized from a largest number of nets to a lowest number of nets.

5. The method of claim 1, further comprising:
for each of the one or more subgroups,
implementing the TDM transmitter circuit at a centroid of the drivers of the subgroup; or
implementing the TDM receiver circuit at a centroid of the loads of the subgroup.

6. The method of claim 1, further comprising:
for each of the one or more subgroups,
selecting the TDM transmitter circuit for the subgroup based on a centroid of the drivers of the subgroup; or
selecting the TDM transmitter circuit for the subgroup based on a centroid of the loads of the subgroup.

7. The method of claim 1, wherein the selected interconnect is selected from a plurality of interconnects dedicated for inter-fabric sub-region nets.

8. The method of claim 1, wherein the selected interconnect is selected from a plurality of interconnects, wherein the selected interconnect is rendered unavailable for a subsequent routing phase that routes portions of the circuit design within individual fabric sub-regions.

9. The method of claim 1, wherein the selected interconnect is implemented in an interposer and the TDM transmitter circuit and the TDM receiver circuit coupled to the one or more selected interconnects implemented in the interposer are disposed in a same die coupled to the interposer.

10. A system, comprising:
a processor configured to initiate operations including:
grouping a plurality of nets of a circuit design having a same net signature according to distance between drivers of the plurality of nets, wherein each net signature specifies location information for the driver of the net and one or more loads of the net;
generating one or more subgroups for each group based on a time-division multiplexing (TDM) ratio to be used for the circuit design, wherein the TDM ratio specifies a number of signals shared on an interconnect used as an inter-fabric sub-region interconnect; and
for one or more of the subgroups, connecting a TDM transmitter circuit to a TDM receiver circuit through a selected interconnect used as the inter-fabric sub-region interconnect, connecting the drivers of the nets of the subgroup to the TDM transmitter circuit, and loads of the nets of the subgroup to the TDM receiver circuit.

11. The system of claim 10, wherein the processor is configured to initiate operations further comprising:
prior to the grouping the plurality of nets having the same net signature according to distance between the drivers, first creating groups of nets of the plurality of nets based on the net signatures.

12. The system of claim 10, wherein each net of the plurality of nets of the circuit design couples a pair of fabric sub-regions of a target integrated circuit for which the circuit design is routed and the location information of each net signature specifies a source fabric sub-region and one or more load fabric sub-regions.

13. The system of claim 10, wherein the subgroups are prioritized for processing based on a number of nets within each subgroup, wherein the subgroups are prioritized from a largest number of nets to a lowest number of nets.

14. The system of claim 10, wherein the processor is configured to initiate operations further comprising:
for each of the one or more subgroups,
implementing the TDM transmitter circuit at a centroid of the drivers of the subgroup; or
implementing the TDM receiver circuit at a centroid of the loads of the subgroup.

15. The system of claim 10, wherein the processor is configured to initiate operations further comprising:
for each of the one or more subgroups,
selecting the TDM transmitter circuit for the subgroup based on a centroid of the drivers of the subgroup; or
selecting the TDM transmitter circuit for the subgroup based on a centroid of the loads of the subgroup.

16. The system of claim 10, wherein the selected interconnect is selected from a plurality of interconnects dedicated for inter-fabric sub-region nets.

17. The system of claim 10, wherein onc or mors of the selected interconnect is implemented in an interposer and the TDM transmitter circuit and the TDM receiver circuit coupled to the selected interconnect implemented in the interposer are disposed in a same die coupled to the interposer.

18. A computer program product comprising one or more computer readable storage mediums having program instructions embodied therewith, wherein the program instructions are executable by computer hardware to cause the computer hardware to initiate executable operations comprising:
grouping a plurality of nets of a circuit design having a same net signature according to distance between drivers of the plurality of nets, wherein each net signature specifies location information for the driver of the net and one or more loads of the net;
generating, using the computer hardware, one or more subgroups for each group based on a time-division multiplexing (TDM) ratio to be used for the circuit design, wherein the TDM ratio specifies a number of signals shared on an interconnect used as an inter-fabric sub-region interconnect; and
for one or more of the subgroups, using the computer hardware, connecting a TDM transmitter circuit to a TDM receiver circuit through a selected interconnect used as the inter-fabric sub-region interconnect, connecting the drivers of the nets of the subgroup to the TDM transmitter circuit, and loads of the nets of the subgroup to the TDM receiver circuit.

19. The computer program product of claim 18, wherein the program instructions are executable by the computer hardware to initiate operations further comprising:
for each of the one or more subgroups,
implementing the TDM transmitter circuit at a centroid of the drivers of the subgroup; or
implementing the TDM receiver circuit at a centroid of the loads of the subgroup.

20. The computer program product of claim 18, wherein the program instructions are executable by the computer hardware to initiate operations further comprising:
for each of the one or more subgroups,
selecting the TDM transmitter circuit for the subgroup based on a centroid of the drivers of the subgroup; or
selecting the TDM transmitter circuit for the subgroup based on a centroid of the loads of the subgroup.

* * * * *